United States Patent
Sawada et al.

(10) Patent No.: US 11,949,112 B2
(45) Date of Patent: Apr. 2, 2024

(54) COLLECTOR LAYER FOR ALL-SOLID-STATE BATTERIES, ALL-SOLID-STATE BATTERY AND CARBON MATERIAL

(71) Applicant: SEKISUI CHEMICAL CO., LTD., Osaka (JP)

(72) Inventors: Yuuki Sawada, Osaka (JP); Hiroki Masuda, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 821 days.

(21) Appl. No.: 17/052,681

(22) PCT Filed: Apr. 24, 2019

(86) PCT No.: PCT/JP2019/017358
§ 371 (c)(1),
(2) Date: Nov. 3, 2020

(87) PCT Pub. No.: WO2019/216216
PCT Pub. Date: Nov. 14, 2019

(65) Prior Publication Data
US 2021/0184219 A1 Jun. 17, 2021

(30) Foreign Application Priority Data
May 9, 2018 (JP) .................................. 2018-090508

(51) Int. Cl.
*H01M 4/66* (2006.01)
*H01M 6/18* (2006.01)
*H01M 10/0562* (2010.01)

(52) U.S. Cl.
CPC ........... *H01M 4/666* (2013.01); *H01M 4/663* (2013.01); *H01M 6/185* (2013.01); *H01M 10/0562* (2013.01); *H01M 2300/0071* (2013.01)

(58) Field of Classification Search
CPC ...... H01M 4/666; H01M 4/663; H01M 6/185; H01M 10/0562; H01M 2300/0071;
(Continued)

(56) References Cited

U.S. PATENT DOCUMENTS

2013/0209873 A1   8/2013  Nagasaka et al.
2017/0179480 A1*  6/2017  Hirose .................. H01M 4/625
(Continued)

FOREIGN PATENT DOCUMENTS

JP   2013-73846   4/2013
JP   2014-29777   2/2014
(Continued)

OTHER PUBLICATIONS

International Search Report dated Jul. 16, 2019 in International (PCT) Application No. PCT/JP2019/017358.
International Preliminary Report on Patentability dated Nov. 10, 2020 in International (PCT) Patent Application No. PCT/JP2019/017358.

*Primary Examiner* — Cynthia K Walls
(74) *Attorney, Agent, or Firm* — Wenderoth, Lind & Ponack, L.L.P.

(57) ABSTRACT

A current collector layer for an all-solid-state battery is provided with which a good electron path can be easily formed and rate characteristic can be improved. A current collector layer 5 for an all-solid-state battery 1, the current collector layer 5 including: a carbon material; and a solid electrolyte, the all-solid-state battery 1 including a group 1 or 2 ion conductive solid electrolyte layer 2, the carbon material being mixed with Si at a weight ratio of 1:1 to produce a mixture, the mixture having an X-ray diffraction (Continued)

spectrum having a ratio of a peak height a to a peak height b, a/b, of 0.2 or more and 10.0 or less as being measured, the peak height a being highest in a range of 2θ of 24° or more and less than 28°, and the peak height b being highest in a range of 2θ of 28° or more and less than 30°.

8 Claims, 1 Drawing Sheet

(58) Field of Classification Search
CPC ...... H01M 4/131; H01M 10/052; H01M 4/62; H01M 6/18; H01M 10/0585; Y02E 60/10; Y02P 70/50; H01B 1/06; H01B 1/04

See application file for complete search history.

(56) References Cited

U.S. PATENT DOCUMENTS

| | | |
|---|---|---|
| 2019/0172655 A1 | 6/2019 | Sasagawa et al. |
| 2019/0173087 A1 | 6/2019 | Sawada et al. |
| 2020/0020974 A1* | 1/2020 | Shimizu ............ H01M 10/0525 |

FOREIGN PATENT DOCUMENTS

| | | |
|---|---|---|
| TW | 201230446 | 7/2012 |
| WO | 2012/141231 | 10/2012 |
| WO | 2014/007215 | 1/2014 |
| WO | 2014/042083 | 3/2014 |
| WO | 2018/043481 | 3/2018 |
| WO | 2018/062285 | 4/2018 |

\* cited by examiner

COLLECTOR LAYER FOR ALL-SOLID-STATE BATTERIES, ALL-SOLID-STATE BATTERY AND CARBON MATERIAL

TECHNICAL FIELD

The present invention relates to a current collector layer for an all-solid-state battery, an all-solid-state battery in which the current collector layer for an all-solid-state battery is used, and a carbon material used in the current collector layer for an all-solid-state battery.

BACKGROUND ART

In recent years, nonaqueous electrolyte secondary batteries have been actively researched and developed for mobile devices, hybrid vehicles, electric vehicles, home electricity storage applications, and the like, and are required to have further high energy density.

As an example of such a nonaqueous electrolyte secondary battery, a configuration is known in which a liquid organic electrolyte produced by dissolving a lithium salt in a flammable organic solvent is used. However, a system in which a liquid organic electrolyte is used has problems such as leakage of the organic electrolyte from the battery and ignition due to the short circuit, and further improvement in safety is required.

In order to meet the requirement, all-solid-state batteries have been developed in which an electrolyte including an inorganic material or a polymer material, that is, a solid electrolyte is used instead of a liquid organic electrolyte.

For example, Patent Document 1 described below discloses an all-solid-state battery including a positive electrode layer, a negative electrode layer, and an electrolyte layer including an oxide-based lithium ion conductive solid electrolyte. Patent Document 1 describes an aluminum foil and a copper foil as a current collector for increasing current collection efficiency.

Patent Document 2 described below discloses an all-solid-state battery in which at least one of the electrode layer and the current collector layer includes a plurality of conductive bodies. Most of the plurality of conductive bodies in Patent Document 2 are oriented so that the direction in which the major axis extends is substantially perpendicular to the stacking direction. Patent Document 2 describes that such a conductive body may have a fiber shape or a flat shape. Furthermore, Patent Document 2 describes that the conductive body may include carbon.

RELATED ART DOCUMENTS

Patent Documents

Patent Document 1: JP 2014-29777 A
Patent Document 2: WO 2014/042083 A

SUMMARY OF THE INVENTION

Problems to be Solved by the Invention

As in Patent Document 1, an all-solid-state battery in which an oxide-based solid electrolyte is used requires to be fired at a high temperature during manufacturing. However, when a metal foil such as an aluminum foil or a copper foil is used in the current collector layer, the current collector layer is sometimes oxidized, and the resistance is sometimes not sufficiently reduced. Therefore, the rate characteristic is sometimes not sufficiently improved.

Even when a conductive body having a fiber shape or a flat shape is used as in Patent Document 2, the resistance is sometimes not sufficiently reduced. Furthermore, in order to orient the direction in which the major axis of the conductive body extends perpendicularly to the stacking direction as in Patent Document 2, the manufacturing process is complicated. Therefore, it is sometimes impossible to easily form a good electron path in the current collector layer.

An object of the present invention is to provide a current collector layer for an all-solid-state battery, an all-solid-state battery in which the current collector layer for an all-solid-state battery is used, and a carbon material used in the current collector layer for an all-solid-state battery, with which a good electron path can be easily formed and rate characteristic can be improved.

Means for Solving the Problem

In a broad aspect of the current collector layer for an all-solid-state battery according to the present invention, the current collector layer is a current collector layer for an all-solid-state battery, the current collector layer including: a carbon material; and a solid electrolyte, the all-solid-state battery including a group 1 or 2 ion conductive solid electrolyte layer, the carbon material being mixed with Si at a weight ratio of 1:1 to produce a mixture, the mixture having an X-ray diffraction spectrum having a ratio of a peak height a to a peak height b, a/b, of 0.2 or more and 10.0 or less as being measured, the peak height a being highest in a range of 2θ of 24° or more and less than 28°, and the peak height b being highest in a range of 2θ of 28° or more and less than 30°.

In a specific aspect of the current collector layer for an all-solid-state battery according to the present invention, the carbon material has a graphene layered structure.

In another specific aspect of the current collector layer for an all-solid-state battery according to the present invention, the carbon material has a graphite structure in which graphite is partially exfoliated.

In another broad aspect of the current collector layer for an all-solid-state battery according to the present invention, the current collector layer is a current collector layer for an all-solid-state battery, the all-solid-state battery including a group 1 or 2 ion conductive solid electrolyte layer, the current collector layer being mixed with Si at a weight ratio of 1:1 to produce a mixture, the mixture having an X-ray diffraction spectrum having a ratio of a peak height a to a peak height b, a/b, of 0.03 or more and 3.5 or less as being measured, the peak height a being highest in a range of 2θ of 24° or more and less than 28°, and the peak height b being highest in a range of 2θ of 28° or more and less than 30°.

In still another specific aspect of the current collector layer for an all-solid-state battery according to the present invention, the ion conductive solid electrolyte layer includes an oxide-based solid electrolyte.

In still another specific aspect of the current collector layer for an all-solid-state battery according to the present invention, the current collector layer is placed on a main surface of at least one of a positive electrode layer and a negative electrode layer for an all-solid-state battery and used.

The all-solid-state battery according to the present invention includes: a group 1 or 2 ion conductive solid electrolyte layer having a first main surface and a second main surface that are opposite from each other; a positive electrode layer provided on the first main surface of the ion conductive solid electrolyte layer; a negative electrode layer provided on the second main surface of the ion conductive solid electrolyte layer; and the current collector layer for an all-solid-state battery configured according to the present invention, provided on a main surface of at least one of the positive electrode layer and the negative electrode layer.

The carbon material according to the present invention is a carbon material used in a current collector layer of an all-solid-state battery, the all-solid-state battery including a group 1 or 2 ion conductive solid electrolyte layer, the carbon material being mixed with Si at a weight ratio of 1:1 to produce a mixture, the mixture having an X-ray diffraction spectrum having a ratio of a peak height a to a peak height b, a/b, of 0.2 or more and 10.0 or less as being measured, the peak height a being highest in a range of $2\theta$ of 24° or more and less than 28°, and the peak height b being highest in a range of $2\theta$ of 28° or more and less than 30°.

Effect of the Invention

According to the present invention, it is possible to provide a current collector layer for an all-solid-state battery, an all-solid-state battery in which the current collector layer for an all-solid-state battery is used, and a carbon material used in the current collector layer for an all-solid-state battery, with which a good electron path can be easily formed and rate characteristic can be improved.

MODES FOR CARRYING OUT THE INVENTION

Hereinafter, details of the present invention will be described.

[Current Collector Layer for all-Solid-State Battery]

The current collector layer for an all-solid-state battery according to the present invention is used in an all-solid-state battery. The all-solid-state battery is not particularly limited, and examples of the all-solid-state battery include primary batteries, secondary batteries, air primary batteries, and air secondary batteries. In the all-solid-state battery, a group 1 or 2 ion conductive solid electrolyte layer is used.

In a broad aspect of the current collector layer for an all-solid-state battery according to the present invention, the current collector layer includes a carbon material and a solid electrolyte. In the present invention, when the X-ray diffraction spectrum of the mixture of the carbon material and Si at a weight ratio of 1:1 is measured, the result is in the following range. That is, the X-ray diffraction spectrum has a ratio of the peak height a to the peak height b, a/b, in the range of 0.2 or more and 10.0 or less, wherein the peak height a is the highest peak in the range of $2\theta$ of 24° or more and less than 28°, and the peak height b is the highest peak in the range of $2\theta$ of 28° or more and less than 30°.

The X-ray diffraction spectrum can be measured by a wide-angle X-ray diffraction method. As the X-ray, a CuKα ray (wavelength: 1.541 Å) can be used. As the X-ray diffractometer, for example, SmartLab (manufactured by Rigaku Corporation) can be used. As Si described above, for example, a silicon powder having a diameter of $\phi$=100 nm or less can be used.

The current collector layer for an all-solid-state battery according to the present invention includes the carbon material and the solid electrolyte, and because the ratio a/b concerning the carbon material is in the above-described range, the resistance can be sufficiently reduced, and the current collecting effect can be enhanced. The reason for this fact can be explained as follows.

As described above, an all-solid-state battery in which an oxide-based solid electrolyte is used is sometimes fired at a high temperature during manufacturing. However, when a current collector layer including a metal foil such as an aluminum foil or a copper foil is used, the current collector layer is oxidized during the firing, and the resistance is sometimes increased.

Meanwhile, the current collector layer for an all-solid-state battery according to the present invention includes the carbon material and the solid electrolyte, so that the carbon material as a conductive material is difficult to oxidize during firing, and the resistance is difficult to increase.

Furthermore, because the ratio a/b concerning the carbon material that is used is in the above-described range, a good electron conduction path can be easily formed in the current collector layer without a complicated manufacturing process of orienting the carbon material, and the resistance can be sufficiently reduced. Therefore, the rate characteristic can be improved.

When a/b described above is less than 0.2, the carbon material itself has a graphite structure immaturely formed, and as a result, has low electron conductivity and a defect. Therefore, there is a possibility that the resistance of the current collector layer will be increased and the battery characteristic will be deteriorated.

When a/b described above is more than 10.0, the carbon material itself is rigid, and as a result, difficult to disperse in the current collector layer of the all-solid-state battery, and there is a possibility that a good electron conduction path will be difficult to form.

From the viewpoint of forming a further good electron conduction path in the current collector layer to further reduce the resistance, the ratio a/b is preferably 0.2 or more and more preferably 0.3 or more, and preferably 8.0 or less and more preferably 5.0 or less.

In another broad aspect of the current collector layer for an all-solid-state battery according to the present invention, when the X-ray diffraction spectrum of the mixture of the current collector layer and Si at a weight ratio of 1:1 is measured, the result is in the following range. That is, the X-ray diffraction spectrum has a ratio of the peak height a to the peak height b, a/b, of 0.03 or more and 3.5 or less, wherein the peak height a is the highest peak in the range of $2\theta$ of 24° or more and less than 28°, and the peak height b is the highest peak in the range of $2\theta$ of 28° or more and less than 30°. The current collector layer is used in an all-solid-state battery including a group 1 or 2 ion conductive solid electrolyte layer. The current collector layer preferably includes the carbon material and the solid electrolyte. The X-ray diffraction spectrum can be measured by the above-described method.

Also in this case, because the ratio a/b concerning the current collector layer is in the above-described range, the resistance can be sufficiently reduced, and the current collecting effect can be enhanced.

From the viewpoint of forming a further good electron conduction path in the current collector layer to further reduce the resistance, the ratio a/b concerning the current collector layer is preferably 0.05 or more and preferably 3.0 or less.

(Carbon Material)

In the present invention, the carbon material preferably has a graphene layered structure.

In the X-ray diffraction spectrum, the peak derived from a graphene layered structure appears in the vicinity of 20-26.4°. The peak derived from Si such as a silicon powder appears in the vicinity of 2θ=28.5°. Therefore, when the carbon material has a graphene layered structure, the ratio a/b can be determined as the peak height ratio of the peak height in the vicinity of 2θ=26.4° to the peak height in the vicinity of 2θ=28.5° ("the peak in the vicinity of 2θ=26.4°"/ "the peak in the vicinity of 2θ=28.5°").

Examples of the carbon material having a graphene layered structure include graphite such as natural graphite, artificial graphite, and expanded graphite, and exfoliated graphite. Among the above-described carbon materials, the carbon materials having a graphite structure and having a structure in which graphite is partially exfoliated are preferable. In this case, the carbon material is two-dimensionally spread in the current collector layer, and a good electron conduction path is further easily formed. In the present invention, the carbon material may be graphene.

The graphite is a laminate of a plurality of sheets of graphene. As the graphite, natural graphite, artificial graphite, expanded graphite, or the like can be used. The expanded graphite has a larger interlayer distance between the graphene layers than normal graphite. Therefore, the expanded graphite can be easily exfoliated.

In the graphite, the number of the stacked graphene sheets (graphene stacking number) is about 100,000 to 1,000,000, and the graphite has a specific surface area by BET method (BET specific surface area) of less than 25 m$^2$/g.

The exfoliated graphite is produced by exfoliating the original graphite, and the word "exfoliated graphite" refers to a graphene sheet laminate thinner than the original graphite. The number of the stacked graphene sheets in the exfoliated graphite is required to be smaller than that in the original graphite.

In the exfoliated graphite, the graphene stacking number is preferably 1,000 or less, and more preferably 500 or less. When the graphene stacking number is the above-described upper limit or less, the specific surface area can be further increased.

The phrase "having a structure in which graphite is partially exfoliated" means that a graphene laminate has graphene layers separated in the range from the edge to the inside to some extent, that is, a part of the graphite is exfoliated at the edge. In addition, the phrase means that in the central portion, the graphite layers are stacked in the same manner as in the original graphite or the primary exfoliated graphite. The portion where a part of the graphite is exfoliated at the edge leads to the central portion. Furthermore, the carbon material in this case may include exfoliated graphite whose edge is exfoliated. Therefore, the carbon material having a structure in which graphite is partially exfoliated can also be referred to as partially exfoliated graphite.

As described above, in the central portion of the partially exfoliated graphite, the graphite layers are stacked in the same manner as in the original graphite or the primary exfoliated graphite. Therefore, in the partially exfoliated graphite, the degree of graphitization is higher than that in conventional graphene oxides and carbon blacks, and the conductivity is further excellent. Furthermore, because the partially exfoliated graphite has a structure in which graphite is partially exfoliated, the specific surface area is large. In addition, because the partially exfoliated graphite has a flat plate shape and a two-dimensional spread, a further good electron conduction path can be formed in the current collector layer, so that the resistance of the current collector layer can be further reduced.

In the present invention, the graphene stacking number in the part where the graphite is partially exfoliated is preferably 5 or more and 3,000 or less. The number is more preferably 5 or more and 1,000 or less, and still more preferably 5 or more and 500 or less.

When the graphene stacking number is the above-described lower limit or more, it is possible to further increase the graphene stacking number in the part where the graphite is partially exfoliated, so that the carbon materials in the current collector layer can be further easily connected. Therefore, the resistance of the current collector layer can be further reduced.

When the graphene stacking number is the above-described upper limit or less, the size of one carbon material can be further reduced, and the uneven distribution of the carbon material in the electrode can be further suppressed. Therefore, a further good electron conduction path can be formed in the current collector layer.

The method of calculating the graphene stacking number is not particularly limited, and the number can be calculated by visual observation with a TEM or the like.

The partially exfoliated graphite can be manufactured by, for example, the method for manufacturing described in WO 2014/034156. Specifically, a composition containing graphite or primary exfoliated graphite and a resin that is fixed to the graphite or the primary exfoliated graphite by grafting or adsorption is prepared, and the resin is thermally decomposed to obtain the partially exfoliated graphite. The resin contained in the composition is preferably removed, but a part of the resin may remain. The primary exfoliated graphite is produced by exfoliating graphite, and the specific surface area of the primary exfoliated graphite is required to be larger than that of graphite.

By the thermal decomposition, the distance between the graphene layers in the graphite or the primary exfoliated graphite is increased. More specifically, in the laminate of the graphene such as the graphite or the primary exfoliated graphite, the graphene layers are separated in the range from the edge to the inside to some extent. That is, it is possible to obtain a structure in which a part of the graphite is exfoliated and the graphite layers are stacked in the central portion in the same manner as in the original graphite or the primary exfoliated graphite.

The content of the resin fixed to the graphite or the primary exfoliated graphite before the thermal decomposition is preferably 0.1 parts by weight or more and more preferably 0.5 parts by weight or more, and preferably 3,000 parts by weight or less and more preferably 1,000 parts by weight or less based on 100 parts by weight of the graphite or the primary exfoliated graphite excluding the resin component. When the content of the resin before the thermal decomposition is in the above-described range, the content of the residual resin after the thermal decomposition is further easily controlled. When the content of the resin before the thermal decomposition is the above-described upper limit or less, the advantage is further increased in terms of cost.

When the resin remains in the partially exfoliated graphite, the amount of the residual resin after the thermal decomposition is preferably 1 part by weight or more and 350 parts by weight or less based on 100 parts by weight of the partially exfoliated graphite excluding the resin component. The amount is more preferably 2 parts by weight or more and 50 parts by weight or less, and still more preferably 3 parts by weight or more and 30 parts by weight or less.

When the amount of the residual resin is less than the above-described lower limit, the BET specific surface area is sometimes not secured. When the amount of the residual resin is more than the above-described upper limit, the manufacturing cost is sometimes increased. The content of the resin before the thermal decomposition and the amount of the residual resin remaining in the partially exfoliated graphite can be calculated by, for example, a thermogravimetric analysis (hereinafter, referred to as TG) in which the weight change due to the heating temperature is measured.

The resin used for producing the composition in which the resin is fixed to the graphite or the primary exfoliated graphite by grafting or adsorption is not particularly limited, and is preferably a polymer of a radically polymerizable monomer. The polymer of a radically polymerizable monomer may be a copolymer including a plurality of kinds of radically polymerizable monomers, or a homopolymer including one kind of radically polymerizable monomers.

Examples of the resin include polypropylene glycol, polyglycidyl methacrylate, polyvinyl acetate, polyvinyl butyral, polyacrylic acid, and polyethylene glycol.

When the carbon material is the partially exfoliated graphite, a/b described above can be adjusted by the heating condition of the thermal decomposition at the time of manufacturing the partially exfoliated graphite or by the amount of the resin fixed to the graphite or the primary exfoliated graphite before the thermal decomposition. For example, by increasing the heating temperature or the heating time, a/b can be increased. Furthermore, by reducing the amount of the resin fixed to the graphite or the primary exfoliated graphite before the thermal decomposition, a/b can be increased.

Figure 2:
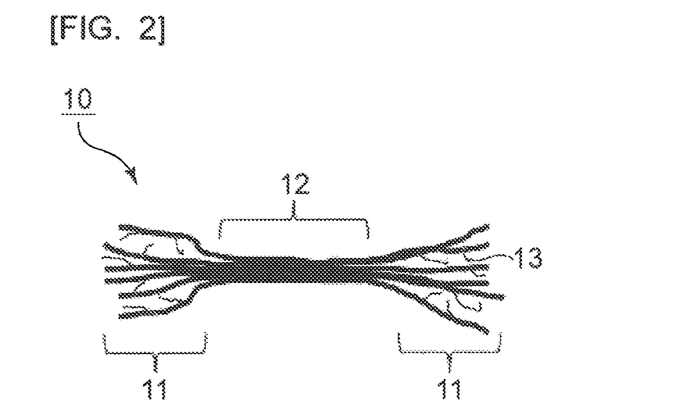
FIG. 2 is a schematic view showing an example of partially exfoliated graphite.

FIG. 2 is a schematic view showing an example of partially exfoliated graphite. As shown in FIG. 2, partially exfoliated graphite 10 has a structure in which an edge portion 11 is exfoliated. In a central portion 12, the partially exfoliated graphite 10 has the same graphite structure as the original graphite or the primary exfoliated graphite. In the edge portion 11, a residual resin 13 is placed between the separated graphene layers.

In the present invention, the carbon material preferably has a particle size of 0.1 µm or more and 100 µm or less. From the viewpoint of further enhancing the handleability, the particle size is more preferably 0.5 µm or more and 50 µm or less. Here, the particle size is a value obtained by measuring the size of each particle from the SEM or TEM image and calculating the average particle size.

In the present invention, the carbon material preferably has a BET specific surface area of 5 $m^2/g$ or more and more preferably 10 $m^2/g$ or more, and preferably 500 $m^2/g$ or less. When the carbon material has a BET specific surface area of the above-described lower limit or more, a further good electron conduction path can be formed in the current collector layer. When the carbon material has a BET specific surface area of the above-described upper limit or less, the handleability during the electrode production can be further enhanced.

In the carbon material used in the present invention, the Raman spectrum obtained by Raman spectroscopy preferably has a ratio D/G of the peak intensity in the D band to the peak intensity in the G band of 0.05 or more and preferably 0.8 or less, and more preferably 0.7 or less. When the ratio D/G is in this range, the conductivity can be further enhanced, and the resistance of the current collector layer can be further reduced.

The current collector layer for an all-solid-state battery according to the present invention may include two or more carbon materials. For example, a first carbon material that is the partially exfoliated graphite and a second carbon material that is different from the partially exfoliated graphite may be included. The second carbon material is not particularly limited, and examples of the second carbon material include graphene, granular graphite compounds, fibrous graphite compounds, and carbon blacks.

The graphene may be graphene oxide or reduced graphene oxide.

The granular graphite compounds are not particularly limited, and examples of the granular graphite compounds include natural graphite, artificial graphite, and expanded graphite.

The fibrous graphite compounds are not particularly limited, and examples of the fibrous graphite compounds include carbon nanohorn, carbon nanotubes, and carbon fibers.

The carbon blacks are not particularly limited, and examples of the carbon blacks include furnace black, Ketjen black, and acetylene black.

On the surface of the second carbon material, a functional group may be present.

The first carbon material that is the partially exfoliated graphite and the second carbon material that is different from the partially exfoliated graphite can be distinguished by, for example, an SEM or a TEM.

In the present invention, the ratio M/N of the weight of the first carbon material M to the weight of the second carbon material N is preferably in the range of 0.01 or more and 100 or less. When the ratio M/N is in the above-described range, the resistance of the current collector layer can be further reduced.

From the viewpoint of further reducing the resistance of the current collector layer, the ratio M/N is preferably 0.05 or more and more preferably 0.1 or more, and preferably 20 or less and more preferably 10 or less.

In the present invention, the content of the carbon material in the current collector layer for an all-solid-state battery is not particularly limited, and is preferably 5 parts by weight or more and more preferably 10 parts by weight or more, and preferably 60 parts by weight or less and more preferably 50 parts by weight or less based on 100 parts by weight of the solid electrolyte. When the content of the carbon material is in the above-described range, the resistance of the current collector layer can be further reduced.

(Solid Electrolyte)

In the solid electrolyte, an ion of the group 1 or 2 is required to be conducted by the battery reaction, and examples of the ion include an H ion, a Li ion, a Na ion, a K ion, a Mg ion, and a Ca ion. Hereinafter, a system in which a Li ion is involved in the battery reaction will be exemplified in detail.

Examples of the solid electrolyte include inorganic solid electrolytes and organic solid electrolytes. Examples of the inorganic solid electrolytes include sulfide-based solid electrolytes and oxide-based solid electrolytes, and examples of the organic solid electrolytes include polymer-based solid electrolytes.

The sulfide-based solid electrolytes are a compound containing at least lithium or sulfur. Examples of such a compound include compounds represented by the formula:

$Li_lX_mS_n$. Note that X is one or more elements other than Li and S, and l, m, and n are in the range of $0.5 \leq l \leq 10$, $0 \leq m \leq 10$, and $1 \leq n \leq 10$.

The sulfide-based solid electrolyte preferably contains X in the above-described formula because a further effect is obtained of improving the stability and the lithium ion conductivity of the sulfide-based solid electrolyte itself. In this case, X is preferably at least one of the group 12, 13, 14, 15, 16, and 17 elements. Furthermore, X is preferably at least one selected from the group consisting of Zn, Al, Si, P, Ge, Sn, Sb, Cl, and I from the viewpoint of further improving the stability of the sulfide-based solid electrolyte itself. Note that X may be one kind of element or two or more kinds of elements.

When $l < 0.5$ or $l > 10$, the conductivity of the lithium ion is sometimes deteriorated.

It is preferable that $0.5 \leq l \leq 8$ because the conductivity of the lithium ion is further improved. It is more preferable that $1 \leq m$ and $n \leq 6$ because the stability of the solid electrolyte itself is further improved.

Examples of such a sulfide-based solid electrolyte include $Li_2S$—$P_2S_5$-based, LiI—$Li_2S$—$P_2S_5$-based, LiI—$Li_2S$—$B_2S_3$-based, LiI—$Li_2S$—$SiS_2$-based, and thio-LISICON-based solid electrolytes.

Among the sulfide-based solid electrolytes, $(A)Li_2S$-$(1-A)GeS_2$, $(A)Li_2S$—$(B)GeS_2$-$(1-A-B)ZnS$, $(A)Li_2S$-$(1-A)Ga_2S_2$, $(A)(B) Li_2S$—$(C) GeS_2$-$(1-A-B-C)Ga_2S_3$, $(A)Li_2S$—$(B)GeS_2$-$(1-A-B)P_2S_5$, $(A)Li_2S$—$(B) GeS_2$-$(1-A-B)Sb_2S_5$, $(A)Li_2S$—$(B)GeS_2$-$(1-A-B)Al_2S_3$, $(A)Li_2S$-$(1-A)SiS_2$, $(A)Li_2S$-$(1-A)P_2S_5$, $(A)Li_2S$-$(1-A)Al_2S_3$, $(A)Li_2S$—$(B) SiS_2$-$(1-A-B)Al_2S_3$, $(A)Li_2S$—$(B)SiS_2$-$(1-A-B)P_2S_5$, and the like are exemplified from the viewpoints of further high stability and lithium ion conductivity, and ease of electrode production. Note that A, B, and C are integers that satisfy $0 \leq A, B, C < 1$, and $A+B+C < 1$.

Among the solid electrolytes, $Li_2S$—$P_2S_5$, $Li_2S$—$GeS_2$, and $Li_2S$—SiS are particularly preferable because of their further high stability and lithium ion conductivity, and the ease of electrode production.

Furthermore, the solid electrolyte may contain Na or the like.

The oxide-based solid electrolytes are a compound containing at least lithium or oxygen. Examples of such a compound include phosphoric acid compounds having a NASICON-type structure and their substitution products in which a part of the phosphoric acid compound is substituted with another element. Furthermore, it is possible to use oxide-based solid electrolytes having a perovskite structure or a structure similar to a perovskite structure, for example, lithium ion conductors having a garnet-type structure or a structure similar to a garnet-type structure, such as a $Li_7La_3Zr_2O_{12}$-based lithium ion conductor, or Li—La—Ti—O-based lithium ion conductors.

Examples of the oxide-based solid electrolytes include $Li_7La_3Zr_2O_{12}$, $Li_7La_3Zr_{2-k}Nb_kO_{12}$, $Li_7La_3Zr_{2-k}Ta_kO_{12}$, $Li_5La_3Ta_2O_{12}$, $Li_{0.33}La_{0.55}TiO_3$, $Li_{1.5}Al_{0.5}Ge_{1.5}P_3O_{12}$, $Li_{1.3}Al_{0.3}Ti_{1.7}P_3O_{12}$, $Li_3PO_4$, $Li_4SiO_4$—$Li_3PO_4$, $Li_4SiO_4$, and $Li_3BO_3$. In this case, the stability and the lithium ion conductivity are further high, and the electrode is easily produced. In the above formula, k satisfies $0 < k < 2$.

The solid electrolyte used in the present invention may include a trace amount of an element other than the above-described elements.

Examples of the polymer-based solid electrolytes include polymers such as polyethylene oxide, polypropylene oxide, and polyethylene glycol.

These solid electrolytes may be used singly or in combination of two or more kinds thereof.

[All-Solid-State Battery]

Hereinafter, the present invention will be clarified by describing specific embodiments of the present invention with reference to the drawing.

Figure 1:
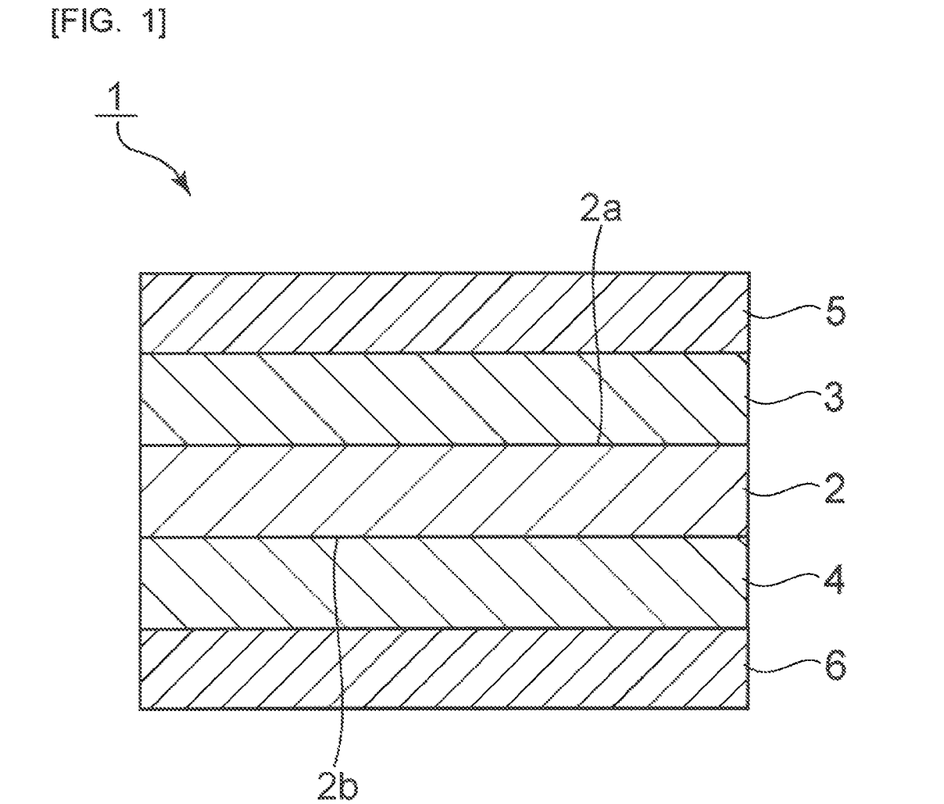
FIG. 1 is a schematic sectional view showing an all-solid-state battery according to one embodiment of the present invention.

FIG. 1 is a schematic sectional view showing an all-solid-state battery according to one embodiment of the present invention. As shown in FIG. 1, an all-solid-state battery 1 includes a solid electrolyte layer 2, a positive electrode layer 3, a negative electrode layer 4, and current collector layers 5 and 6.

The solid electrolyte layer 2 is a group 1 or 2 ion conductive solid electrolyte layer. The solid electrolyte layer 2 has a first main surface 2a and a second main surface 2b that are opposite from each other.

The positive electrode layer 3 is provided on the first main surface 2a of the solid electrolyte 2. The current collector layer 5 is provided on the main surface, opposite from the solid electrolyte layer 2, of the positive electrode layer 3. The negative electrode layer 4 is provided on the second main surface 2b of the solid electrolyte layer 2. The current collector layer 6 is provided on the main surface, opposite from the solid electrolyte 2, of the negative electrode layer 4.

In the all-solid-state battery 1 of the present embodiment, both the current collector layer 5 on the positive electrode layer 3 side and the current collector layer 6 on the negative electrode layer 4 side are the above-described current collector layer for an all-solid-state battery according to the present invention. However, in the present invention, at least one of the current collector layer 5 on the positive electrode layer 3 side and the current collector layer 6 on the negative electrode layer 4 side is required to be the above-described current collector layer for an all-solid-state battery according to the present invention. Furthermore, as long as the current collector layer for an all-solid-state battery is provided on at least one of the positive electrode layer 3 and the negative electrode layer 4, the current collector layer is not required to be provided on the other electrode layer.

As described above, in the all-solid-state battery according to the present invention, because the current collector layer for an all-solid-state battery according to the present invention is placed on the main surface of at least one of the positive electrode layer and the negative electrode layer, a good electron path can be easily formed in the current collector layer, and the resistance can be sufficiently reduced. Therefore, the all-solid-state battery according to the present invention has an excellent battery characteristic such as a rate characteristic.

Hereinafter, details of each member included in the all-solid-state battery will be described.

(Solid Electrolyte Layer)

The solid electrolyte layer of the all-solid-state battery according to the present invention includes a group 1 or 2 ion conductive solid electrolyte. The group 1 or 2 ion conductive solid electrolyte is not particularly limited, and the solid electrolyte described in the section of the current collector layer for an all-solid-state battery described above can be used. The solid electrolyte may be used singly or in combination of two or more kinds.

(Positive Electrode Layer)

The positive electrode layer of the all-solid-state battery according to the present invention includes, for example, a positive electrode active material described below, a solid electrolyte, and a conductive auxiliary. The solid electrolyte is not particularly limited, and the solid electrolyte described in the section of the current collector layer for an all-solid-state battery described above can be used. The conductive auxiliary is not particularly limited, and a conventionally known conductive auxiliary and the carbon material used in the above-described current collector layer for an all-solid-state battery can be used. Among the conductive auxiliaries, the carbon material used in the above-described current collector layer for an all-solid-state battery is preferable. In this case, the conductivity can be further enhanced, and the battery characteristic such as a rate characteristic can be further enhanced. The solid electrolyte, as well as the conductive auxiliary, may be used singly or in combination of two or more kinds.

The potential of the positive electrode active material is required to be higher than the battery reaction potential of the negative electrode active material described below. At this time, an ion of the group 1 or 2 is required to be involved in the battery reaction, and examples of the ion include an H ion, a Li ion, a Na ion, a K ion, a Mg ion, and a Ca ion. Hereinafter, a system in which a Li ion is involved in the battery reaction will be exemplified in detail.

In this case, examples of the positive electrode active material include lithium metal oxides, lithium sulfide, and sulfur.

Examples of the lithium metal oxides include lithium metal oxides having a spinel structure, a layered tock salt structure, or an olivine structure.

The surface of the positive electrode active material may be surface-coated with Li—Nb oxide or the like so that Li ions further easily move at the interface between the positive electrode active material and the solid electrolyte.

The positive electrode active material may be used singly or in combination of two or more kinds.

The positive electrode layer may include only the positive electrode active material, the conductive auxiliary, and the solid electrolyte, and may additively include a binder from the viewpoint of further easily forming the positive electrode layer.

The binder is not particularly limited, and for example, polyvinyl alcohol, polyvinyl acetal, cellulose, acrylic, urethanes, vinyl acetate, polyvinylidene fluoride (PVdF), polytetrafluoroethylene (PTFE), styrene-butadiene rubber, polyimides, and derivatives thereof can be used. The binder may be used singly or in combination of two or more kinds.

In the production of the positive electrode layer, the positive electrode active material, the conductive auxiliary, the solid electrolyte, and the like may be all mixed and then molded, or a composite of the positive electrode active material and the conductive auxiliary may be produced, and then mixed with the solid electrolyte and the like and molded. Alternatively, a composite of the positive electrode active material and the solid electrolyte may be produced, and then mixed with the conductive auxiliary and the like and molded.

Examples of the method of molding the positive electrode layer include a method in which a positive electrode active material and a solid electrolyte are mixed by a mixer, mechanical milling, or the like, and then molded by a press. Only the positive electrode layer may be molded by a press, or the positive electrode layer, the solid electrolyte layer, the negative electrode layer, and the current collector layer may be molded by a press together.

Furthermore, in order to further improve the moldability of the solid electrolyte, heat treatment may be applied after the molding particularly when the oxide-based solid electrolyte is used.

The ratio of the solid electrolyte to the positive electrode active material included in the positive electrode layer is preferably 0.1 to 200 of the weight of the solid electrolyte based on 100 of the weight of the positive electrode active material.

When the weight of the solid electrolyte is less than 0.1, it is sometimes difficult to form an electron conduction path or a lithium ion conduction path. When the weight of the solid electrolyte is more than 200, the energy density of the all-solid-state battery is sometimes decreased.

The thickness of the positive electrode layer is not particularly limited, and is preferably 10 μm or more and 1,000 μm or less. When the thickness is less than 10 μm, it is sometimes difficult to obtain a desired capacity. When the thickness is more than 1,000 μm, it is sometimes difficult to obtain a desired output density.

The electric capacity per 1 $cm^2$ of the positive electrode layer is preferably 0.5 mAh or more and 100.0 mAh or less. When the electric capacity is less than 0.5 mAh, the volume of the battery having a desired capacity is sometimes increased. When the electric capacity is more than 100 mAh, it is sometimes difficult to obtain a desired output density. The electric capacity per 1 $cm^2$ of the positive electrode layer is more preferably 0.8 mAh or more and 50 mAh or less because the relationship between the volume and the output density in the battery is further good. The electric capacity is more preferably 1.0 mAh or more and 20 mAh or less. The electric capacity per 1 $cm^2$ of the positive electrode layer may be calculated by measurement in which a positive electrode layer is produced and then a half-cell with a lithium metal as a counter electrode is produced to measure the charge/discharge characteristic.

The electric capacity per 1 $cm^2$ of the positive electrode layer is not particularly limited, and can be controlled by the weight of the positive electrode layer formed per unit area of the current collector layer.

Negative Electrode Layer;

In the negative electrode layer of the all-solid-state battery according to the present invention, for example, a lithium metal or a lithium alloy can be used. Alternatively, a negative electrode material including a negative electrode active material, a solid electrolyte, and a conductive auxiliary may be used.

The negative electrode layer of the all-solid-state battery according to the present invention can have, for example, the same configuration as that described for the positive electrode layer except for the negative electrode active material described below.

The potential of the negative electrode active material is required to be lower than the battery reaction potential of the positive electrode active material described above. At this time, an ion of the group 1 or 2 is required to be involved in the battery reaction, and examples of the ion include an H ion, a Li ion, a Na ion, a K ion, a Mg ion, and a Ca ion. Hereinafter, a system in which a Li ion is involved in the battery reaction will be exemplified in detail.

Examples of the negative electrode active material used in the present invention include a lithium metal, lithium metal oxides, carbon materials, metal compounds, and organic compounds.

The metal is not limited as long as it can react with a lithium ion and can be alloyed, and examples of the metal include Li, Mg, Ca, Al, Si, Ge, Sn, Pb, As, Sb, Bi, Ag, Au, Zn, Cd, Hg, and In. Among the metals, Li, Al, Si, Ge, Sn, Ti, Pb, and In are preferable, and Li, Si, Sn, and Ti are more preferable from the viewpoint of further increasing the volume energy density and the weight energy density. Furthermore, Si and Sn are still more preferable because of their further high reactivity with a lithium ion.

The metals may be used singly, or an alloy containing two or more metals may be used. A mixture of two or more metals may also be used. In order to further improve the stability, an alloy containing a metal other than the above-described metals may be used, or a metal doped with a non-metal element such as P or B may be used.

Examples of the metal compounds include metal oxides, metal nitrides, and metal sulfides. From the viewpoint of further enhancing the stability, metal oxides are preferable. As the metal oxides, a silicon oxide, a tin oxide, a titanium oxide, a tungsten oxide, a niobium oxide, and a molybdenum oxide are preferable because they have further high reactivity with a lithium ion.

The metal oxides may be used singly, or an oxide of an alloy including two or more metals may be used. A mixture of two or more metal oxides may also be used. In order to further improve the stability, a metal oxide doped with a different metal or with a non-metal element such as P or B may be used.

Examples of the titanium oxide include lithium titanate and $H_2T_{12}O_{25}$.

Examples of the carbon material include artificial graphite and hard carbon.

The negative electrode active material preferably has a particle size of 0.001 μm or more and 50 μm or less. From the viewpoint of further enhancing the handleability, the particle size is more preferably 0.01 μm or more and 30 μm or less. The particle size is a value obtained by measuring the size of each particle from the SEM or TEM image and calculating the average particle size. Note that the particle size may be the size of a single crystal or the size of a single crystal granulated body.

Examples of the organic substance include polyacene.

The negative electrode active material may be used singly or in combination of two or more kinds.

(Current Collector Layer)

In the all-solid-state battery according to the present invention, the above-described current collector layer for an all-solid-state battery according to the present invention can be used. The solid electrolyte included in the current collector layer may be the same as or different from the solid electrolyte included in the positive electrode layer, the negative electrode layer, or the solid electrolyte layer. However, from the viewpoint of further enhancing the adhesiveness between the layers, the same solid electrolytes are preferably used in the positive electrode layer, the negative electrode layer, the solid electrolyte layer, and the current collector layer.

The thickness of the current collector layer is not particularly limited, and is preferably 1 μm or more and more preferably 5 μm or more, and preferably 100 μm or less and more preferably 50 μm or less. When the thickness of the current collector layer is less than the above-described lower limit, the current collector layer is sometimes difficult to handle from the viewpoint of the production. In addition, a sufficient current collecting effect is sometimes not obtained. When the thickness of the current collector layer is more than the above-described upper limit, the current collector layer is sometimes disadvantageous from the viewpoint of economy.

The method for manufacturing the current collector layer is not particularly limited, and for example, the current collector layer can be manufactured as described below.

First, to a carbon material and a solid electrolyte, a binder solution is added and mixed to produce a slurry.

As the binder solution, for example, a solution in which a binder is dissolved or dispersed in a nonaqueous solvent or water can be used.

The binder can preferably be removed in the firing step described below, and is not particularly limited. For example, polyvinyl alcohol, polyvinyl acetal, cellulose, acrylic, a urethane, vinyl acetate, polyvinylidene fluoride (PVdF), polytetrafluoroethylene (PTFE), styrene-butadiene rubber, a polyimide, or a derivative thereof is used. The binder may be used singly or in combination of two or more kinds.

The nonaqueous solvent is not particularly limited, and examples of the nonaqueous solvent include toluene, xylene, ethanol, N-methyl-2-pyrrolidone (NMP), dimethylformamide, dimethylacetamide, methyl ethyl ketone, methyl acetate, ethyl acetate, and tetrahydrofuran. The nonaqueous solvent may be used singly or in combination of two or more kinds. A dispersant and a thickener may be added to the nonaqueous solvent.

As the method of producing the slurry, a conventional method can be used. Examples of the method include a method in which a mixer, a ball mill, a bead mill, or the like is used for mixing. The mixer used for the mixing is not particularly limited, and examples of the mixer include planetary mixers, dispersers, thin-film spin mixers, jet mixers, and rotation/revolution mixers.

From the viewpoint of further easy application, the solid content concentration of the slurry is preferably 30% by weight or more and 95% by weight or less. From the viewpoint of further enhancing the storage stability, the solid content concentration of the slurry is more preferably 35% by weight or more and 90% by weight or less. Furthermore, from the viewpoint of further suppressing the manufacturing cost, the solid content concentration of the slurry is still more preferably 40% by weight or more and 85% by weight or less.

The solid content concentration can be controlled with a diluting solvent. As the diluting solvent, it is preferable to use the same solvent as the binder solution or the dispersing liquid. Another solvent may be used as long as the solvent is compatible.

Next, the produced slurry is applied to a substrate represented by a polyethylene terephthalate (hereinafter referred to as PET) sheet and dried to produce a green sheet.

The method of applying the slurry is not particularly limited, and examples of the method include a method in which the slurry is applied with a doctor blade, a die coater, a comma coater, or the like and then the solvent is removed, a method in which the slurry is applied by spraying and then the solvent is removed, and a method in which the slurry is applied by screen printing and then the solvent is removed.

The method of removing the solvent is preferably a method of drying in which a blow oven or a vacuum oven is used from the viewpoint of further simplicity. Examples of the atmosphere in which the solvent is removed include an air atmosphere, an inert gas atmosphere, and a vacuum state.

The temperature at which the solvent is removed is not particularly limited, and is preferably 60° C. or more and 200° C. or less. When the temperature at which the solvent is removed is less than 60° C., the removal of the solvent sometimes takes time. When the temperature at which the solvent is removed is more than 250° C., the substrate sometimes deteriorates.

Next, the green sheet is cut into a predetermined shape with a Thomson blade or the like, stacked on a positive electrode layer or a negative electrode layer of a laminate in which the negative electrode layer, a solid electrolyte layer, and the positive electrode layer are stacked in this order, and pressed with a pressing machine or the like to obtain a laminate. The current collector layer can be produced in this manner, and the obtained laminate can be used as it is as an all-solid-state battery.

However, when an oxide-based solid electrolyte is used as the solid electrolyte, the laminate is fired to produce a current collector layer, and the fired laminate can be used as an all-solid-state battery.

The firing temperature of the laminate is not particularly limited, and may be, for example, 200° C. to 1,000° C.

As described above, the manufacturing process of an all-solid-state battery in which an oxide-based solid electrolyte is used further includes a step of firing at a high temperature. However, in the current collector layer for an all-solid-state battery according to the present invention, the carbon material as a conductive material is difficult to oxidize and the resistance is difficult to increase, as described above. Therefore, the current collector layer for an all-solid-state battery according to the present invention can be further suitably used in an all-solid battery in which an oxide-based solid electrolyte is used. However, the current collector layer for an all-solid-state battery according to the present invention can also be used in an all-solid battery in which another solid electrolyte is used. Also in this case, the resistance of the current collector layer can be sufficiently reduced, and the current collecting effect can be enhanced.

Hereinafter, the present invention will be described more specifically with reference to Examples. However, the present invention is not limited to these Examples, and can be appropriately modified as long as the gist of the present invention is not changed.

Manufacturing Example 1 of Carbon Material

First, a mixture of 16 g of expanded graphite, 0.48 g of carboxymethyl cellulose, and 530 g of water was irradiated with an ultrasonic wave for 5 hours with an ultrasonic treatment device, then 80 g of polyethylene glycol was added, and the mixture was mixed for 30 minutes with a homomixer to produce a raw material composition.

As the expanded graphite, "PF Powder 8F" (trade name) (BET specific surface area=22 m$^2$/g, average particle size=10 μm) manufactured by TOYO TANSO CO., LTD. was used. The carboxymethyl cellulose manufactured by Sigma-Aldrich Co. LLC. (average molecular weight=250,000) was used. As the polyethylene glycol, "PG600" (trade name) manufactured by Sanyo Chemical Industries, Ltd. was used. As the ultrasonic treatment device, "UH-600SR" (model number) manufactured by SMT. CO., LTD. was used. As the homomixer, "T. K. HOMOMIXER MARK II" (model number) manufactured by Tokushu Kika Kogyo Co., Ltd. was used.

Next, the produced raw material composition was heat-treated at 150° C. to remove the water. Then, the composition from which the water had been removed was heat-treated at a temperature of 380° C. for 1 hour to produce a carbon material in which a part of the polyethylene glycol remained.

Finally, the produced carbon material was heat-treated at 400° C. for 30 minutes and at 350° C. for 2 hours in this order to obtain a carbon material having a graphite structure in which graphite is partially exfoliated (partially exfoliated graphite). The obtained carbon material included 12% by weight of resin based on the total weight. As the amount of the resin, the amount of the weight loss was calculated in the range of 200° C. to 600° C. using TG ("STA7300" (product number) manufactured by Hitachi High-Tech Science Corporation).

The ratio D/G of the peak intensity in the D band to the peak intensity in the G band in the Raman spectrum of the obtained carbon material was measured, and the result was 0.234. The Raman spectrum of the carbon material was measured using a Raman spectroscope ("Nicolet Almega XR" (trade name) manufactured by Thermo Scientific).

The maximum peak intensity in the range of 1,300 cm$^{-1}$ to 1,400 cm$^{-1}$ in the obtained Raman spectrum was determined as the peak intensity in the D band, and the maximum peak intensity of 1,500 cm$^{-1}$ to 1600 cm$^{-1}$ was determined as the peak intensity in the G band to obtain the ratio D/G.

The BET specific surface area of the obtained carbon material was measured using a specific surface area measuring device ("ASAP-2000" (product number) manufactured by SHIMADZU CORPORATION, nitrogen gas), and the result was 95 m$^2$/g.

Furthermore, the obtained carbon material and a silicon powder (Nano Powder, purity≥8%, particle size≤100 nm, manufactured by Sigma-Aldrich Co. LLC.) were put in a sample bottle at a weight ratio of 1:1 and mixed to produce a mixed powder as a measurement sample. The produced mixed powder was put on a non-reflective Si sample stage, and the stage was set on an X-ray diffractometer (Smart Lab, manufactured by Rigaku Corporation). Then, the X-ray diffraction spectrum was measured by a wide-angle X-ray diffraction method under the conditions of an X-ray source: CuKα (wavelength: 1.541 Å), a measurement range: 3° to 80°, and a scan speed: 5°/min. From the obtained measurement result, the peak height b highest in the range of 2θ=28° or more and less than 30° was normalized as 1, and the peak height a highest in the range of 2θ=24° or more and less than 28° at that time was calculated. Finally, the ratio of a to b, that is, a/b was calculated.

As a result, the ratio of the peak height a to the peak height b a/b was 0.647 wherein the peak height a is the highest peak in the range of 2θ of 24° or more and less than 28°, and the peak height b is the highest peak in the range of 2θ of 28° or more and less than 30°.

Manufacturing Example 2 of Oxide-Based Solid Electrolyte Powder

A $Li_{1.5}Al_{0.5}Ge_{1.5}(PO_4)_3$ powder as an oxide-based lithium ion conductive solid electrolyte was produced in the following procedure.

First, $GeO_2$ (manufactured by KANTO CHEMICAL CO., INC.), $Li_2CO_3$ (manufactured by Wako Pure Chemical Industries, Ltd.), $(NH_3)_2HPO_4$ (manufactured by KISHIDA CHEMICAL Co., Ltd.), and $Al_2O_3$ (manufactured by Kojundo Chemical Laboratory Co., Ltd.) were weighed so that the molar ratio was Li:Al:Ge:PO$_4$=1.5:0.5:1.5:3.

Next, they were put into an alumina pot together with a zirconia ball, and ground and mixed in an ethanol solvent.

Furthermore, the ethanol was vaporized, and the resulting mixture was heat-treated at 900° C. for 2 hours. To the heat-treated sample, a zirconia ball was put, and the sample was ground and mixed in an ethanol solvent.

Finally, the sample after the grinding and mixing was dried, and the ethanol was vaporized to obtain a $Li_{1.5}Al_{0.5}Ge_{1.5}(PO_4)_3$ powder that was an oxide-based lithium ion conductive solid electrolyte.

Manufacturing Example 3 of Carbon Material

First, 6 g of an expanded graphite powder ("PF Powder 8F" (trade name) manufactured by TOYO TANSO CO., LTD., BET specific surface area=22 m²/g, average particle size=10 μm), 0.2 g of carboxymethyl cellulose sodium salt, 200 g of water, and 120 g of polyethylene glycol were mixed with a homomixer for 30 minutes to produce a raw material composition.

The carboxymethyl cellulose sodium salt manufactured by Sigma-Aldrich Co. LLC. (average molecular weight=250,000) was used. As the polyethylene glycol, "PG600" (trade name) manufactured by Sanyo Chemical Industries, Ltd. was used. As the homomixer, "T. K. HOMO-MIXER MARK II" (model number) manufactured by Tokushu Kika Kogyo Co., Ltd. was used.

Next, the produced raw material composition was heat-treated at 150° C. to remove the water. Then, the composition from which the water had been removed was heat-treated at a temperature of 370° C. for 1 hour to produce a carbon material in which a part of the polyethylene glycol remained.

Finally, the produced carbon material was heat-treated at 420° C. for 0.3 hours to obtain a carbon material having a graphite structure in which graphite is partially exfoliated (partially exfoliated graphite).

In the obtained carbon material, the ratio D/G was 0.759, the BET specific surface area was 250 m²/g, and the ratio a/b was 0.24.

Example 1

Production of positive electrode active material-carbon material composite;

$LiNi_{0.8}Co_{0.15}Al_{0.05}O_2$ as a positive electrode active material was manufactured by the following method.

First, nickel hydroxide containing cobalt (Ni:Co=8:1 (molar ratio)) and sodium aluminate were put in a glass beaker, pure water was added, and the mixture was stirred to obtain a suspension of nickel hydroxide, in which sodium aluminate was dissolved. Then, sulfuric acid was added dropwise until the pH of the suspension reached 7, and the precipitate was filtered and vacuum-dried. Next, to the dried product containing cobalt-containing nickel hydroxide and aluminum hydroxide, lithium hydroxide monohydrate was added so that the molar ratio was Li:(Ni+Co+Al)=1:1, and mixed. Finally, the resulting product was heated at 700° C. for 24 hours while oxygen was blown to produce a positive electrode active material.

A composite of the positive electrode active material ($LiNi_{0.8}Co_{0.15}Al_{0.05}O_2$ (NCA)) and the carbon material in Manufacturing Example 1 was produced in the following procedure.

First, to 0.6 g of the carbon material produced in Manufacturing Example 1, 59.4 g of ethanol was added, the mixture was treated for 2 hours with an ultrasonic cleaner (manufactured by AS ONE CORPORATION) to prepare a dispersing liquid 1 of the carbon material produced in Manufacturing Example 1 (hereinafter, referred to as a dispersing liquid of the carbon material in Example 1).

Next, 2.4 g of the positive electrode active material was added to 21.6 g of ethanol, and the mixture was stirred with a magnetic stirrer at 600 rpm for 10 minutes to prepare a dispersing liquid of the positive electrode active material in Example 1.

Subsequently, the dispersing liquid of the positive electrode active material in Example 1 was dropped into the dispersing liquid 1 of the carbon material in Example 1 with a syringe. During the dropping, the dispersing liquid 1 of the carbon material in Example 1 was continuously treated with an ultrasonic cleaner (manufactured by AS ONE CORPORATION). Then, the mixture of the dispersing liquid 1 of the carbon material in Example 1 and the dispersing liquid of the positive electrode active material in Example 1 was stirred with a magnetic stirrer for 2 hours.

Finally, the mixture of the dispersing liquids was subjected to suction filtration, and then, the resulting mixture was vacuum-dried at 110° C. for 1 hour to produce a composite of the positive electrode active material and the carbon material in Example 1 (positive electrode active material-carbon material composite). The above-described steps were repeated to produce the composite of the amount required for producing a positive electrode.

Production of Positive Electrode;

A positive electrode was produced in the following procedure.

First, the obtained positive electrode active material-carbon material composite and the oxide-based solid electrolyte manufactured in Manufacturing Example 2 were weighed so that the weight ratio was 80:20 (80% by weight and 20% by weight). Next, these materials were mixed by mechanical milling (a planetary ball mill manufactured by Fritsch GmbH, P-6 type, rotation speed: 380 rpm, 1 hour). Finally, the mixed powder of the positive electrode active material-carbon material composite and the oxide-based solid electrolyte, obtained through the above-described steps (100 mg) was placed on a SUS substrate (diameter: 20 mm, thickness: 0.5 mm), and press-molded at 360 Mpa to produce a positive electrode in Example 1. The steps from the weighing of each material to the press-molding and the storage of the positive electrode were performed in an argon atmosphere with a dew point of −60° C. or less.

Production of negative electrode active material-carbon material composite;

A composite of a negative electrode active material and the carbon material produced in Manufacturing Example 1 was produced in the following procedure.

First, to 0.015 g of the carbon material produced in Manufacturing Example 1, 1.5 g of ethanol was added, the mixture was treated for 2 hours with an ultrasonic cleaner (manufactured by AS ONE CORPORATION) to prepare a dispersing liquid 2 of the carbon material in Manufacturing Example 1 (hereinafter, referred to as a dispersing liquid 2 of the carbon material in Example 1).

Next, 2.4 g of a negative electrode active material (lithium titanate (LTO)) was added to 21.6 g of ethanol, and the mixture was stirred with a magnetic stirrer at 600 rpm for 10 minutes to prepare a dispersing liquid of the negative electrode active material in Example 1.

The LTO was produced by the method described in a document (J. Electrochem. Soc., Volume 142, Issue 5, pp. 1431 (1995)). That is, first, titanium dioxide and lithium hydroxide were mixed so that the molar ratio of titanium to lithium was 5:4, and then this mixture was heated at 800° C. for 12 hours in a nitrogen atmosphere to produce lithium titanate to be used in this Example.

Subsequently, the dispersing liquid of the negative electrode active material in Example 1 was dropped into the dispersing liquid 2 of the carbon material in Example 1 with a syringe. During the dropping, the dispersing liquid 2 of the carbon material in Example 1 was continuously treated with an ultrasonic cleaner (manufactured by AS ONE CORPORATION). Then, the mixture of the dispersing liquid 2 of the carbon material in Example 1 and the dispersing liquid of the negative electrode active material in Example 1 was stirred with a magnetic stirrer for 2 hours.

Finally, the mixture of the dispersing liquids was subjected to suction filtration, and then, the resulting mixture was vacuum-dried at 110° C. for 1 hour to produce a composite of the negative electrode active material and the carbon material in Example 1 (negative electrode active material-carbon material composite). The above-described steps were repeated to produce the composite of the amount required for producing a negative electrode.

Production of Negative Electrode;

The negative electrode in this Example was produced in the following procedure.

First, the negative electrode active material-carbon material composite and the oxide-based solid electrolyte manufactured in Manufacturing Example 2 were weighed so that the weight ratio was 50:50 (50% by weight and 50% by weight). Next, these materials were mixed by mechanical milling (a planetary ball mill manufactured by Fritsch GmbH, P-6 type, rotation speed: 380 rpm, 1 hour). Finally, the mixed powder of the negative electrode active material-carbon material composite and the oxide-based solid electrolyte, obtained through the above-described steps (200 mg) was placed on a SUS substrate (diameter: 20 mm, thickness: 0.5 mm), and press-molded at 360 Mpa to produce a negative electrode in Example 1. The steps from the weighing of each material to the press-molding and the storage of the negative electrode were performed in an argon atmosphere with a dew point of −60° C. or less.

Production of Current Collector Layer;

The carbon material in Manufacturing Example 1 and the oxide-based solid electrolyte manufactured in Manufacturing Example 2 were weighed so that the weight ratio was 30:70 (30% by weight and 70% by weight). Next, these materials were mixed by mechanical milling (a planetary ball mill manufactured by Fritsch GmbH, P-6 type, rotation speed: 380 rpm, 1 hour) to produce a mixed powder. A binder (polyvinyl alcohol, solid content concentration: 5% by weight, a mixed solution of toluene and ethanol) was mixed with the mixed powder so that the solid content was 60 parts by weight to produce a slurry. Next, the slurry was applied to a PET film (150 μm) with an applicator (clearance: 50 μm), then heated with a blow oven at 100° C. for 1 hour to remove the solvent, and then vacuum-dried at 110° C. for 1 hour. Finally, the PET film was peeled off to produce a green sheet of a current collector layer.

Production of all-Solid-State Battery;

The all-solid-state battery in Example 1 was produced in the following procedure. First, as a solid electrolyte layer, the oxide-based solid electrolyte produced in Manufacturing Example 2 was used to produce a pellet of the oxide-based solid electrolyte (diameter: 14 mm, thickness: 100 μm). Next, the positive electrode layer, the negative electrode layer, and the green sheet of the current collector layer were cut into a circle having a diameter of 14 mm. Next, the green sheet of the current collector layer, the positive electrode, the pellet of the oxide-based solid electrolyte, the negative electrode, and the green sheet of the current collector layer were stacked in this order, and then the resulting laminate was clamped under a pressure of 1 ton and heated at 80° C. for 1 hour to bind the layers. Furthermore, the resulting laminate was fired at a temperature of 500° C. for 1 hour in a nitrogen gas atmosphere containing oxygen at a content of 5% to remove the binder, and then fired at a temperature of 600° C. for 10 hours in a nitrogen gas atmosphere to obtain a laminate. Finally, the laminated was sealed with a 2032 type coin cell to produce an all-solid-state battery in Example 1.

Separately, the current collector layer portion of the all-solid-state battery was ground with a mortar, then the ground current collector layer and a silicon powder (Nano Powder, purity≥98%, particle size≤100 nm, manufactured by Sigma-Aldrich Co. LLC.) were mixed in a sample bottle at a weight ratio of 1:1, and the ratio a/b was calculated in the same manner as described above. The result was 0.194.

Example 2

An all-solid-state battery was produced in the same manner as in Example 1 except that the carbon material having a graphene layered structure produced in Manufacturing Example 3 was used as the carbon material. The ratio a/b concerning the current collector layer portion of the all-solid-state battery was 0.072.

Example 3

A carbon material was obtained by changing the heat treatment at 420° C. for 0.3 hours to the heat treatment at 420° C. for 1.8 hours in the step in Manufacturing Example 3. In the carbon material, the ratio D/G was 0.120, the BET specific surface area was 28 $m^2$/g, and the ratio a/b was 4.23. An all-solid-state battery was produced in the same manner as in Example 2 except that this carbon material was used. The ratio a/b concerning the current collector layer portion of the all-solid-state battery was 1.269.

Example 4

A carbon material was obtained by changing the heat treatment at 420° C. for 0.3 hours to the heat treatment at 420° C. for 3.0 hours in the step in Manufacturing Example 3. In the carbon material, D/G was 0.061, the BET specific surface area was 26 $m^2$/g, and the ratio a/b was 9.11. An all-solid-state battery was produced in the same manner as in Example 2 except that this carbon material was used. The ratio a/b concerning the current collector layer portion of the all-solid-state battery was 2.733.

Comparative Example 1

In Comparative Example 1, an all-solid-state battery was produced in the same manner as in Example 1 except that in the production of the current collector layer, acetylene black ("DENKA BLACK" (trade name) manufactured by Denka Company Limited) was used instead of the carbon material produced in Manufacturing Example 1. The ratio D/G of the peak intensity in the D band to the peak intensity in the G band in the Raman spectrum of the acetylene black was 0.95. The BET specific surface area of the acetylene black was measured by the same method as that of the carbon material in Manufacturing Example 1, and the result was 60 $m^2$/g. The X-ray diffraction spectrum of the acetylene black was measured by the same method as that of the carbon material in Manufacturing Example 1. As a result, the ratio of the peak height a to the peak height b a/b was 0.09 wherein the peak height a is the highest peak in the range of 2θ of 24° or more and less than 28°, and the peak height b is the highest peak in the range of 2θ of 28° or more and less than 30°. The ratio a/b concerning the current collector layer portion of the all-solid-state battery was 0.027.

Comparative Example 2

An all-solid-state battery was produced in the same manner as in Comparative Example 1 except that in the carbon material used for producing the current collector layer, commercially available highly oriented pyrolytic graphite (HOPG) was used as it was instead of acetylene black ("DENKA BLACK" (trade name) manufactured by Denka Company Limited, ratio a/b=0.09). In the carbon material, the ratio D/G was 0.041, the BET specific surface area was 3 m²/g, and the ratio a/b was 11.90. The ratio a/b concerning the current collector layer portion of the all-solid-state battery was 3.570.

(Evaluation)

The rate characteristics of the all-solid-state batteries produced in Examples 1 to 4 and Comparative Examples 1 and 2 were evaluated by the following method. The results are shown in Table 1 below.

After the charging, a rest for 1 minute was given, the all-solid battery was discharged at 0.7 mA (small current) or 3.5 mA (large current) to 1.5 V, and the capacity (discharge capacity) at each current value was calculated. Finally, the discharge capacity at 0.7 mA was divided by the discharge capacity at 3.5 mA (discharge capacity at 0.7 mA/discharge capacity at 3.5 mA) to evaluate the rate characteristic (ratio). The rate characteristic was evaluated in accordance with the following evaluation criteria.

[Evaluation Criteria]

A . . . rate characteristic is 70% or more

B . . . rate characteristic is less than 70%

TABLE 1

| | Positive electrode layer | | | Negative electrode layer | | | Current collector layer |
|---|---|---|---|---|---|---|---|
| | Active material | Conductive auxiliary | Solid electrolyte | Active material | Conductive auxiliary | Solid electrolyte | Conductive auxiliary |
| Example 1 | NCA | Partially exfoliated graphite | NASICON ($Li_{1.5}Al_{0.5}Ge_{1.5}(PO_4)_3$) | LTO | Partially exfoliated graphite | NASICON ($Li_{1.5}Al_{0.5}Ge_{1.5}(PO_4)_3$) | Partially exfoliated graphite |
| Example 2 | NCA | Partially exfoliated graphite | NASICON ($Li_{1.5}Al_{0.5}Ge_{1.5}(PO_4)_3$) | LTO | Partially exfoliated graphite | NASICON ($Li_{1.5}Al_{0.5}Ge_{1.5}(PO_4)_3$) | Partially exfoliated graphite |
| Example 3 | NCA | Partially exfoliated graphite | NASICON ($Li_{1.5}Al_{0.5}Ge_{1.5}(PO_4)_3$) | LTO | Partially exfoliated graphite | NASICON ($Li_{1.5}Al_{0.5}Ge_{1.5}(PO_4)_3$) | Partially exfoliated graphite |
| Example 4 | NCA | Partially exfoliated graphite | NASICON ($Li_{1.5}Al_{0.5}Ge_{1.5}(PO_4)_3$) | LTO | Partially exfoliated graphite | NASICON ($Li_{1.5}Al_{0.5}Ge_{1.5}(PO_4)_3$) | Partially exfoliated graphite |
| Comparative Example 1 | NCA | Partially exfoliated graphite | NASICON ($Li_{1.5}Al_{0.5}Ge_{1.5}(PO_4)_3$) | LTO | Partially exfoliated graphite | NASICON ($Li_{1.5}Al_{0.5}Ge_{1.5}(PO_4)_3$) | Acetylene black |
| Comparative Example 2 | NCA | Partially exfoliated graphite | NASICON ($Li_{1.5}Al_{0.5}Ge_{1.5}(PO_4)_4$) | LTO | Partially exfoliated graphite | NASICON ($Li_{1.5}Al_{0.5}Ge_{1.5}(PO_4)_4$) | Highly oriented pyrolytic graphite |

| | Current collector layer | | | | | Rate characteristic (2 C discharge capacity vs 0.2 C discharge capacity) | |
|---|---|---|---|---|---|---|---|
| | Ratio a/b concerning single conductive auxiliary | Ratio a/b concerning current collector layer | BET specific surface area of conductive auxiliary | Ratio D/G in conductive auxiliary | Solid electrolyte | | |
| Example 1 | 0.647 | 0.194 | 95 m²/g | 0.234 | NASICON ($Li_{1.5}Al_{0.5}Ge_{1.5}(PO_4)_3$) | 78% | A |
| Example 2 | 0.24 | 0.072 | 250 m²/g | 0.759 | NASICON ($Li_{1.5}Al_{0.5}Ge_{1.5}(PO_4)_3$) | 72% | A |
| Example 3 | 4.23 | 1.269 | 28 m²/g | 0.120 | NASICON ($Li_{1.5}Al_{0.5}Ge_{1.5}(PO_4)_3$) | 81% | A |
| Example 4 | 9.11 | 2.733 | 26 m²/g | 0.061 | NASICON ($Li_{1.5}Al_{0.5}Ge_{1.5}(PO_4)_3$) | 82% | A |
| Comparative Example 1 | 0.09 | 0.027 | 60 m²/g | 0.951 | NASICON ($Li_{1.5}Al_{0.5}Ge_{1.5}(PO_4)_3$) | 55% | B |
| Comparative Example 2 | 11.90 | 3.570 | 3 m²/g | 0.041 | NASICON ($Li_{1.5}Al_{0.5}Ge_{1.5}(PO_4)_4$) | 65% | B |

The all-solid-state batteries produced in Examples 1 to 4 and Comparative Examples 1 and 2 were each put in a thermostat at 25° C., and connected to a charge/discharge test device ("HJ1005SD8" (product number) manufactured by HOKUTO DENKO CORPORATION). Next, the all-solid-state battery was put in a thermostat at 25° C., and connected to a charge/discharge test device ("HJ1005SD8" (product number) manufactured by HOKUTO DENKO CORPORATION). Next, the all-solid-state battery was charged at a constant current and a constant voltage (current value: 0.7 mA, charge end voltage: 2.70 V, constant voltage charge voltage: 2.70 V, constant voltage charge end condition: elapse of 3 hours or a current value of 0.07 mA).

EXPLANATION SYMBOLS

1: All-solid-state battery
2: Solid electrolyte layer
2a, 2b: First and second main surface
3: Positive electrode layer
4: Negative electrode layer
5, 6: Current collector layer
10: Partially exfoliated graphite
11: Edge portion
12: Central portion
13: Residual resin

The invention claimed is:

1. A current collector layer for an all-solid-state battery, the current collector layer comprising:
   a carbon material; and
   a solid electrolyte,
   the all-solid-state battery including a group 1 or 2 ion conductive solid electrolyte layer,
   the carbon material being mixed with Si at a weight ratio of 1:1 to produce a mixture, the mixture having an X-ray diffraction spectrum having a ratio of a peak height a to a peak height b, a/b, of 0.2 or more and 10.0 or less as being measured, the peak height a being highest in a range of 2θ of 24° or more and less than 28°, and the peak height b being highest in a range of 2θ of 28° or more and less than 30°.

2. The current collector layer for an all-solid-state battery according to claim 1, wherein the carbon material has a graphene layered structure.

3. The current collector layer for an all-solid-state battery according to claim 1, wherein the carbon material has a graphite structure in which graphite is partially exfoliated.

4. A current collector layer for an all-solid-state battery,
   the all-solid-state battery including a group 1 or 2 ion conductive solid electrolyte layer,
   the current collector layer being mixed with Si at a weight ratio of 1:1 to produce a mixture, the mixture having an X-ray diffraction spectrum having a ratio of a peak height a to a peak height b, a/b, of 0.03 or more and 3.5 or less as being measured, the peak height a being highest in a range of 2θ of 24 or more and less than 28°, and the peak height b being highest in a range of 2θ of 28 or more and less than 30°.

5. The current collector layer for an all-solid-state battery according to claim 1, wherein the ion conductive solid electrolyte layer includes an oxide-based solid electrolyte.

6. The current collector layer for an all-solid-state battery according to claim 1, the current collector layer placed on a main surface of at least one of a positive electrode layer and a negative electrode layer for an all-solid-state battery and used.

7. An all-solid-state battery comprising:
   a group 1 or 2 ion conductive solid electrolyte layer having a first main surface and a second main surface that are opposite from each other;
   a positive electrode layer provided on the first main surface of the ion conductive solid electrolyte layer;
   a negative electrode layer provided on the second main surface of the ion conductive solid electrolyte layer; and
   the current collector layer for an all-solid-state battery according to claim 1, provided on a main surface of at least one of the positive electrode layer and the negative electrode layer.

8. A carbon material used in a current collector layer of an all-solid-state battery,
   the all-solid-state battery including a group 1 or 2 ion conductive solid electrolyte layer,
   the carbon material being mixed with Si at a weight ratio of 1:1 to produce a mixture, the mixture having an X-ray diffraction spectrum having a ratio of a peak height a to a peak height b, a/b, of 0.2 or more and 10.0 or less as being measured, the peak height a being highest in a range of 2θ of 24° or more and less than 28°, and the peak height b being highest in a range of 2θ of 28° or more and less than 30°.

* * * * *